United States Patent
Jang et al.

(10) Patent No.: US 7,898,501 B2
(45) Date of Patent: Mar. 1, 2011

(54) MOBILE TERMINAL INCLUDING FOLDER TYPE LIQUID CRYSTAL DISPLAY DEVICE AND METHOD OF FABRICATING THE SAME

(75) Inventors: Myong-Gi Jang, Seoul (KR);
Nam-Yong Kong, Seongnam-si (KR);
Seong-Man Jeon, Seoul (KR);
Soon-Shin Jung, Uiwang-si (KR);
Eun-Ju Kim, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 1096 days.

(21) Appl. No.: 11/239,001

(22) Filed: Sep. 30, 2005

(65) Prior Publication Data
US 2006/0125784 A1 Jun. 15, 2006

(30) Foreign Application Priority Data
Dec. 13, 2004 (KR) ............. 10-2004-0105066

(51) Int. Cl.
*G09G 5/00* (2006.01)
(52) U.S. Cl. .................... 345/1.3; 349/95
(58) Field of Classification Search ........... 345/1.1–1.3; 349/95; 455/575.3, 575.4, 575.1
See application file for complete search history.

(56) References Cited

U.S. PATENT DOCUMENTS

| | | | | |
|---|---|---|---|---|
| 4,959,641 A * | 9/1990 | Bass et al. | ............... | 345/6 |
| 5,398,125 A * | 3/1995 | Willett et al. | ............... | 349/95 |
| 6,184,850 B1 * | 2/2001 | Suzuki et al. | ............... | 345/74.1 |
| D539,276 S * | 3/2007 | Kim | ............... | D14/248 |
| D539,792 S * | 4/2007 | Kim | ............... | D14/248 |
| 2002/0113751 A1* | 8/2002 | Knopf | ............... | 345/4 |
| 2003/0067420 A1* | 4/2003 | Ernst et al. | ............... | 345/1.3 |
| 2003/0162560 A1* | 8/2003 | Kaneko | ............... | 455/550 |
| 2003/0189759 A1* | 10/2003 | Kim et al. | ............... | 359/619 |
| 2004/0046885 A1* | 3/2004 | Regan et al. | ............... | 348/333.11 |
| 2006/0232496 A1* | 10/2006 | Sato | ............... | 345/1.3 |

FOREIGN PATENT DOCUMENTS

| | | |
|---|---|---|
| CN | 1261245 | 7/2000 |
| CN | 1397131 | 2/2003 |
| JP | 09-247250 | 9/1997 |
| JP | 10-207395 | 8/1998 |
| JP | 11-249596 | 9/1999 |
| JP | 2000-501857 | 2/2000 |
| JP | 2000-305475 | 11/2000 |
| JP | 2001-056455 | 2/2001 |
| JP | 2001117499 | 4/2001 |
| JP | 2001-125069 | 5/2001 |

(Continued)

*Primary Examiner*—Amr Awad
*Assistant Examiner*—Aaron Midkiff
(74) *Attorney, Agent, or Firm*—McKenna Long & Aldridge LLP

(57) ABSTRACT

A mobile terminal having a flat panel display device includes: a body unit having an input device; a display unit connected to the body unit; an extended display unit connected to the display unit using a hinge such that the display unit and the extended display unit are folded/unfolded; a first flat panel display device formed in the display unit; and a second flat panel display device in the extended display unit.

34 Claims, 13 Drawing Sheets

FOREIGN PATENT DOCUMENTS

| | | |
|---|---|---|
| JP | 2001-350428 | 12/2001 |
| JP | 2002-218030 | 8/2002 |
| JP | 2002-218303 | 8/2002 |
| JP | 2003-032335 | 1/2003 |
| JP | 2003-134212 | 5/2003 |
| JP | 2003169271 A * | 6/2003 |
| JP | 2003-298884 | 10/2003 |
| JP | 2004-198472 | 7/2004 |
| KR | 10-2003-0045892 | 6/2003 |
| KR | 10-2004-0044829 | 5/2004 |

* cited by examiner

MOBILE TERMINAL INCLUDING FOLDER TYPE LIQUID CRYSTAL DISPLAY DEVICE AND METHOD OF FABRICATING THE SAME

This application claims the benefit of Korean Patent Application No. 2004-0105066, filed on Dec. 13, 2004, which is hereby incorporated by reference for all purposes as if set forth herein.

BACKGROUND OF THE INVENTION

1. Field of the Invention

The present invention relates to a mobile terminal including a flat panel display device and a method of fabricating a mobile terminal, and more particularly, to a mobile terminal including a flat panel display device and a method of fabricating the same.

2. Discussion of the Related Art

Recently, as the International Mobile Telecommunication 2000 (IMT 2000) service, which is referred to as a dream mobile communication or a terminus of wireless communication, is commercialized, the world has become a global community. The IMT 2000 service utilizes a low earth orbit satellite system. Thus, a high speed wireless communication with voice or images may be served using only a single mobile terminal that is not limited by domestic location or a foreign location, even when users are traveling by ground, sea or air. IMT 2000 may be classified as a third generation mobile communication, after analog mobile communication and personal communication service (PCS). The most important element of an IMT 2000 is a mobile terminal possessed by users. Accordingly, a mobile terminal having a portable size and sufficient user interfaces is required. At the same time, transmission and performance of audio/video (A/V) contents with high quality via a mobile terminal are required. As a result, a mobile terminal for a cellular phone, a notebook computer, a laptop computer or a personal digital assistant (PDA) is designed to have a larger display area even with a smaller size mobile terminal.

A liquid crystal display (LCD) device is widely used for displaying images in a mobile terminal because an LCD device has advantages in a contrast ratio and a color reproducibility over other flat panel displays (FPD). Currently, display quality of an LCD device is similar to that of a cathode ray tube (CRT) because of recent technological improvements.

In general, the LCD device uses an optical anisotropy and polarization properties of liquid crystal molecules to produce an image. Due to the optical anisotropy of the liquid crystal molecules, refraction of light incident onto the liquid crystal molecules depends upon the alignment direction of the liquid crystal molecules. The liquid crystal molecules have long thin shapes that can be aligned along specific directions. The alignment direction of the liquid crystal molecules can be controlled by applying an electric field. Accordingly, the alignment of the liquid crystal molecules changes in accordance with the direction of the applied electric field. Thus, by properly controlling the electric field applied to a group of liquid crystal molecules within respective pixel regions, a desired image can be produced by appropriately refracting and transmitting the incident light.

There are several types of LCD devices, one of which is commonly referred to as active matrix LCD (AM-LCD) device. The AM-LCD device includes an array of pixels forming a matrix. Each of the pixels in the AM-LCD device includes a thin film transistor (TFT) and a pixel electrode. The AM-LCD devices are currently being developed because of their high resolution and superior quality for displaying moving pictures.

FIG. 1 illustrates a folder type mobile terminal including an LCD device according to the related art. In a folder type mobile terminal of FIG. 1, a larger display area is obtained with a smaller total size as compared with a mobile terminal in which a body unit having a key pad and a display unit having an LCD device are arranged in a single plane. The folder type mobile terminal includes a body unit 2 and a display unit 6 which are folded or unfolded using a hinge 10. The body unit 6 includes a control or input device 4 such as a key pad and the display unit 6 includes an LCD device 8. Accordingly, almost all of the area of the display unit 6, which is substantially the same as an area of the body unit 2, may be used for displaying images when the mobile terminal is unfolded. Thus, the mobile terminal has a portable size corresponding to the body unit 2 or the display unit 6 when the mobile terminal is folded.

In the mobile terminal, however, images are displayed by a single LCD device 8 having an area smaller than the display unit 6. Accordingly, a user's request for displaying high video contents is not satisfied. In addition, mobile terminals now often combine several functions. For example, a cellular phone may include a digital camera or a navigation system, and movies may be displayed by a cellular phone using a satellite. However, since only a single LCD device having a finite display area is used for displaying images, the full size of the display area is limited to the single LCD device.

SUMMARY OF THE INVENTION

Accordingly, the present invention is directed to a mobile terminal including a liquid crystal display device and a method of fabricating the same that substantially obviates one or more of the problems due to limitations and disadvantages of the related art.

An advantage of the present invention is to provide a mobile terminal displaying high quality video contents with a portable size and a large display area, and a method of fabricating the same.

Another advantage of the present invention is to provide a mobile terminal including at least two flat panel display devices that are folded/unfolded and used for displaying images.

Another advantage of the present invention is to provide a mobile terminal including at least two flat panel display devices where image separation at a connection portion between the at least two flat panel display devices is reduced and the at least two flat panel display devices display a single image or at least two images according to a selected mode.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a mobile terminal having a flat panel display device includes: a body unit having a control button; a display unit connected to the body unit; an extended display unit connected to the display unit using a hinge such that the display unit and the extended display unit are folded/unfolded; a first flat panel display device in the display unit; and a second flat panel display device in the extended display unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

A mobile terminal according to the present invention can be embodied as one of a cellular phone, a notebook computer, a personal digital assistant (PDA), a navigation device, a digital camera, a digital camcorder, and a small-sized television application for vehicles or the like. Other applications of the mobile terminal according to the present invention are possible and contemplated in the present invention.

Figure 1:
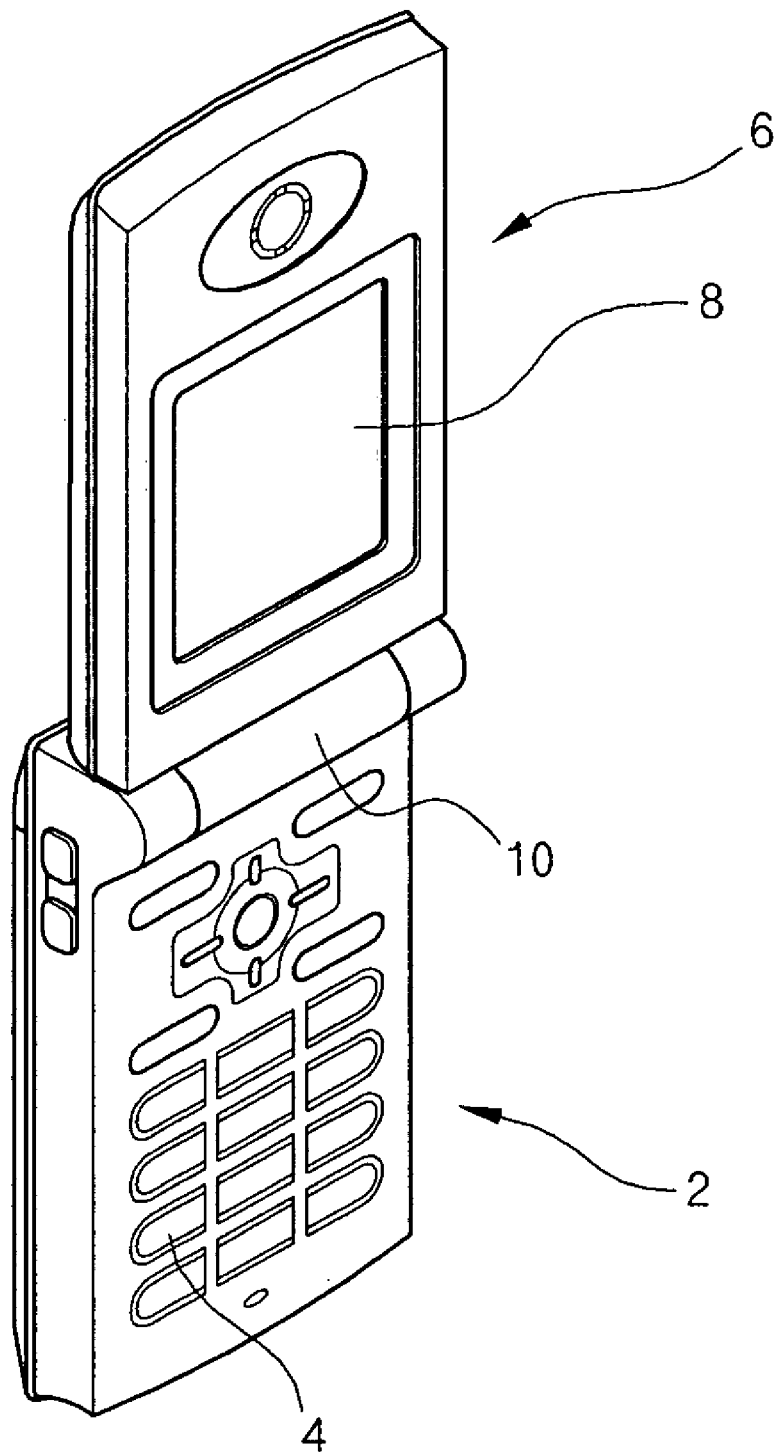
FIG. 1 illustrates a folder type mobile terminal including an LCD device according to the related art.
Figure 2A:
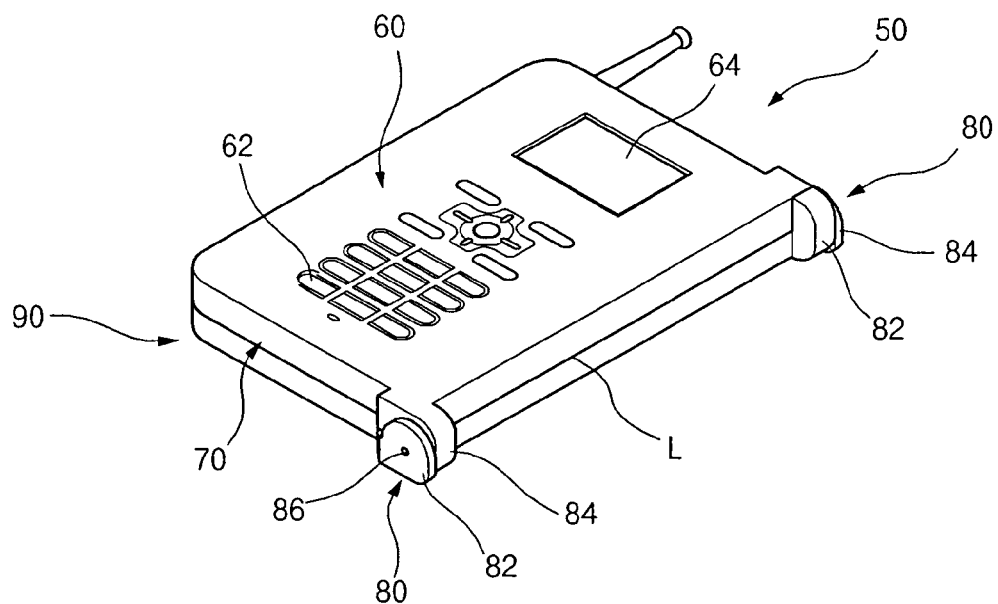
FIGS. 2A and 2B are schematic perspective views illustrating operating states of a mobile terminal according to an embodiment of the present invention. For example, a cellular phone is shown as a mobile terminal.
Figure 2B:
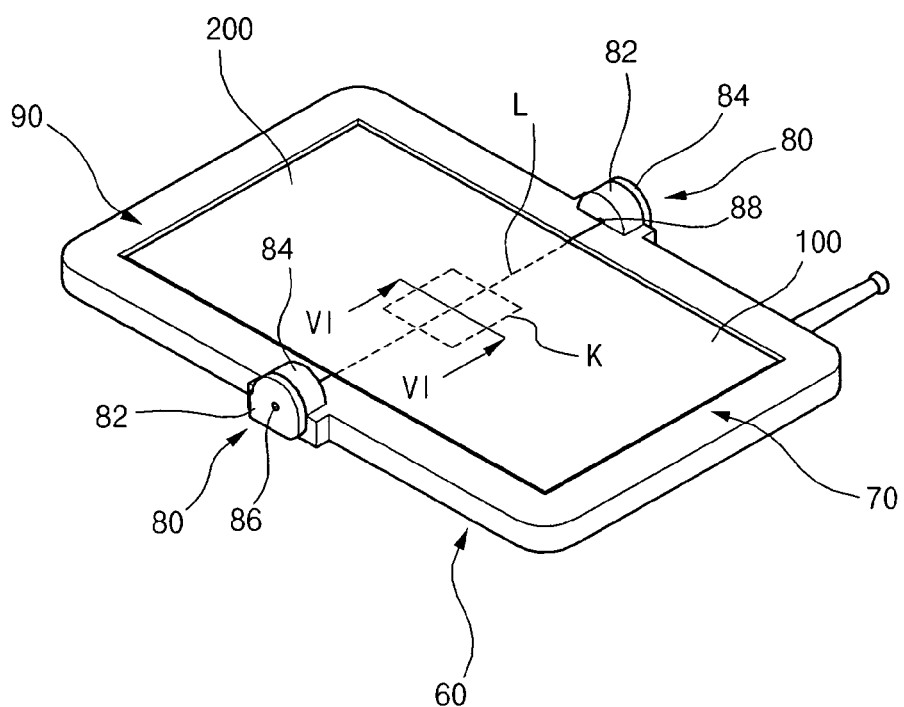

FIGS. 2A and 2B are schematic perspective views showing operating states of a mobile terminal according to an embodiment of the present invention. For example, a cellular phone is shown as a mobile terminal.

In FIGS. 2A and 2B, a mobile terminal 50 includes a body unit 60 having an input device 62, a display unit 70 combined to the body unit 60, and an extended display unit 90 connected to the display unit 70 using a hinge 80. The display unit 70 is disposed at an opposite surface to the input device 62. Accordingly, as illustrated in FIG. 2a, the input device 62, such as a key pad, is disposed at a front surface of the body unit 60 when the mobile terminal 50 is folded. Moreover, although not shown, one or more speakers are included in the mobile terminal in the case of cellular phones. Such speakers may include standard speakers for normal use, jacks for earphones, and loud speakers.

In addition, as illustrated in FIG. 2B, first and second liquid crystal display (LCD) devices 100 and 200 attached to the display unit 70 and the extended display unit 90, respectively, constitute an area for displaying images when the mobile terminal 50 is unfolded. Other flat panel display devices may be used in place of LCD devices 100 and 200. An additional flat panel display (FPD) 64 may be disposed on the front surface of the body unit 60 and spaced apart from the control 62. The additional FPD 64 may be used for displaying images without unfolding the display unit 70 and the extended display unit 90.

The mobile terminal 50 has a portable size by folding the display unit 70 and the extended display unit 90. In addition, the mobile terminal 50 has a large display size by unfolding the display unit 70 and the extended display unit 90 and using a whole area of the first and second LCD devices 100 and 200 for displaying images. The first LCD device 100 may have the same structure as the second LCD device 200.

Figure 3:
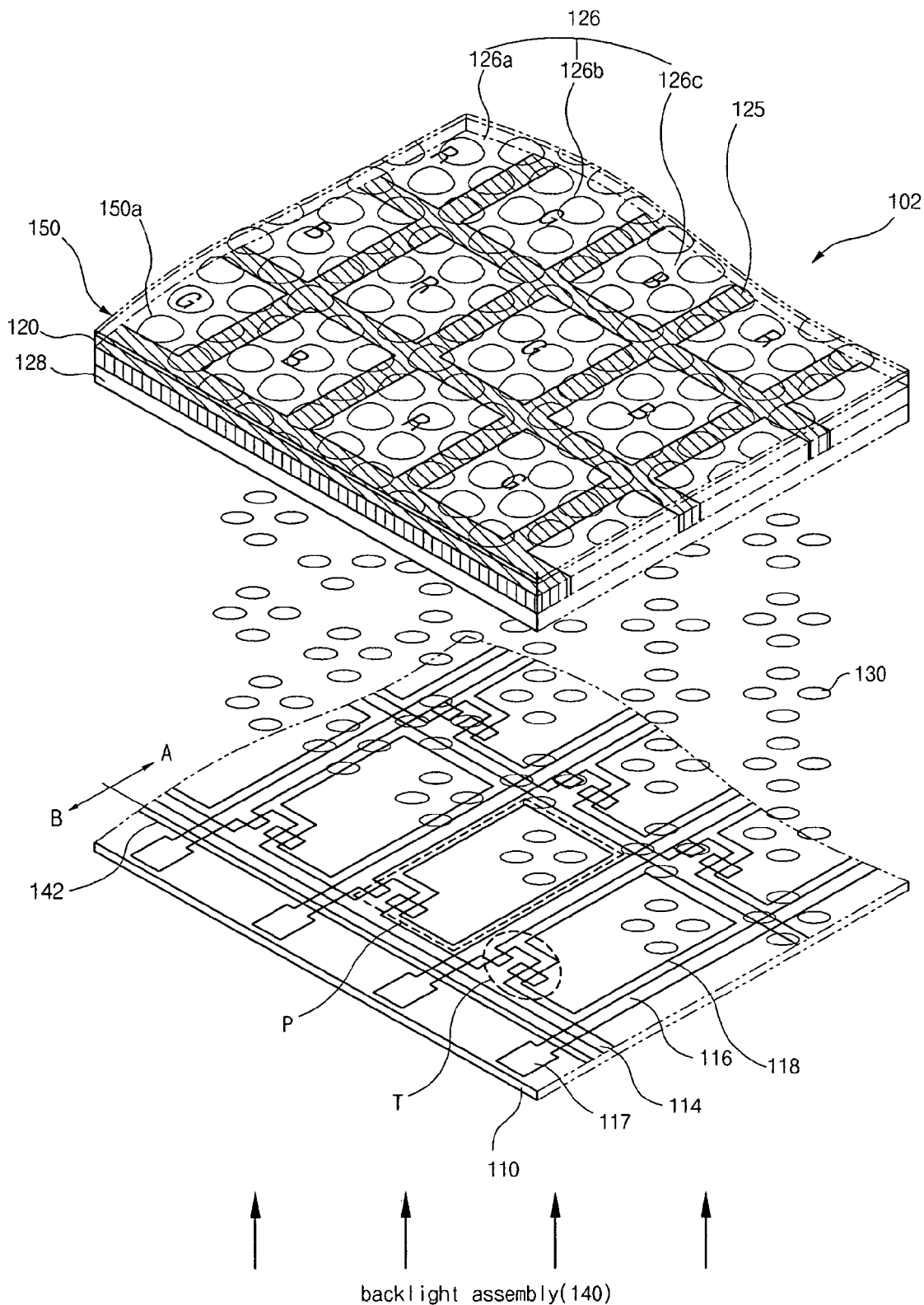
FIG. 3 is a schematic exploded perspective view illustrating a flat panel display device of a mobile terminal according to a first embodiment of the present invention.

FIG. 3 is a schematic exploded perspective view illustrating a flat panel display device of a mobile terminal according to a first embodiment of the present invention. Other flat panel display devices may be substituted for the liquid crystal display devices used for the sake of illustration herein.

In FIG. 3, an LCD device includes a liquid crystal panel 102 including first and second substrates 110 and 120, and a backlight assembly 140 for supplying light to the liquid crystal panel 102. The first and second substrates 110 and 120 are spaced apart from each other, and a liquid crystal layer 130 is interposed between the first and second substrates 110 and 120. The first substrate 110 is referred to as a lower substrate or an array substrate, and the second substrate 120 is referred to as an upper substrate or a color filter substrate.

A gate line 114 and a data line 116 are formed on an inner surface of the first substrate 110. The gate line 114 and the data line 116 cross each other to define a pixel region "P" and a thin film transistor (TFT) "T" is connected to the gate line 114 and the data line 116. A pixel electrode 118 of a transparent conductive material connected to the TFT "T" is disposed in each pixel region "P." A black matrix 125 and a color filter layer 126 are formed on an inner surface of the second substrate 120. The black matrix 125 covers the gate line 114, the data line 116 and the TFT "T" of the first substrate 110, which correspond to portions not driving the liquid crystal layer 130, and has openings in the matrix exposing the pixel electrode 118. The color filter layer 126 includes red, green and blue sub-color filters 126a, 126b and 126c sequentially disposed in the openings. A common electrode 128 of a transparent conductive material is formed on the black matrix 125 and the color filter layer 126.

Even though not shown in FIG. 3, first and second polarizing films may be formed on outer surfaces of the first and second substrates 110 and 120, respectively. Moreover, alignment layers may be formed on the pixel electrode 118 and the common electrode 128, respectively. A micro lens film 150 may be formed over the outer surface of the second substrate 120.

Since the liquid crystal panel 102 does not have an emissive element, the backlight assembly 140 is disposed under the first substrate 110. The backlight assembly 140 may include a light guide plate (LGP) and optical sheets to supply uniform light to the liquid crystal panel 102. Furthermore, at least one light emitting diode (LED) may be used as a light source of the backlight assembly 140.

An alignment direction of liquid crystal molecules and a transmittance of the liquid crystal layer 130 are changed due to a voltage difference between the pixel electrode 118 and the common electrode 128, and the liquid crystal panel 102 displays various images by the transmittance difference of light from the backlight assembly 140 and a combination of red, green and blue sub-color filters 126a, 126b and 126c.

Referring again to FIGS. 2A and 2B, each of the first and second LCD devices 100 and 200 in the display unit 70 and the extended display unit 90, respectively, of the mobile terminal 50 may include a liquid crystal panel 102 (of FIG. 3) and a backlight assembly 140 (of FIG. 3).

Referring again to FIG. 3, to attach the first and second substrates 110 and 120 of the LCD panel 102, a seal pattern 142 is formed at a boundary portion of the first and second substrates 110 and 120, and the liquid crystal panel 102 may be divided into a display region "A" and a non-display region "B" surrounding the display region "A" with the seal pattern 142 as a border. Accordingly, the pixel region "P" is disposed in the display region "A," and a gate pad at one end of the gate line 114 and a data pad at one end of the data line 116 are disposed in the non-display region "B."

Figure 4:
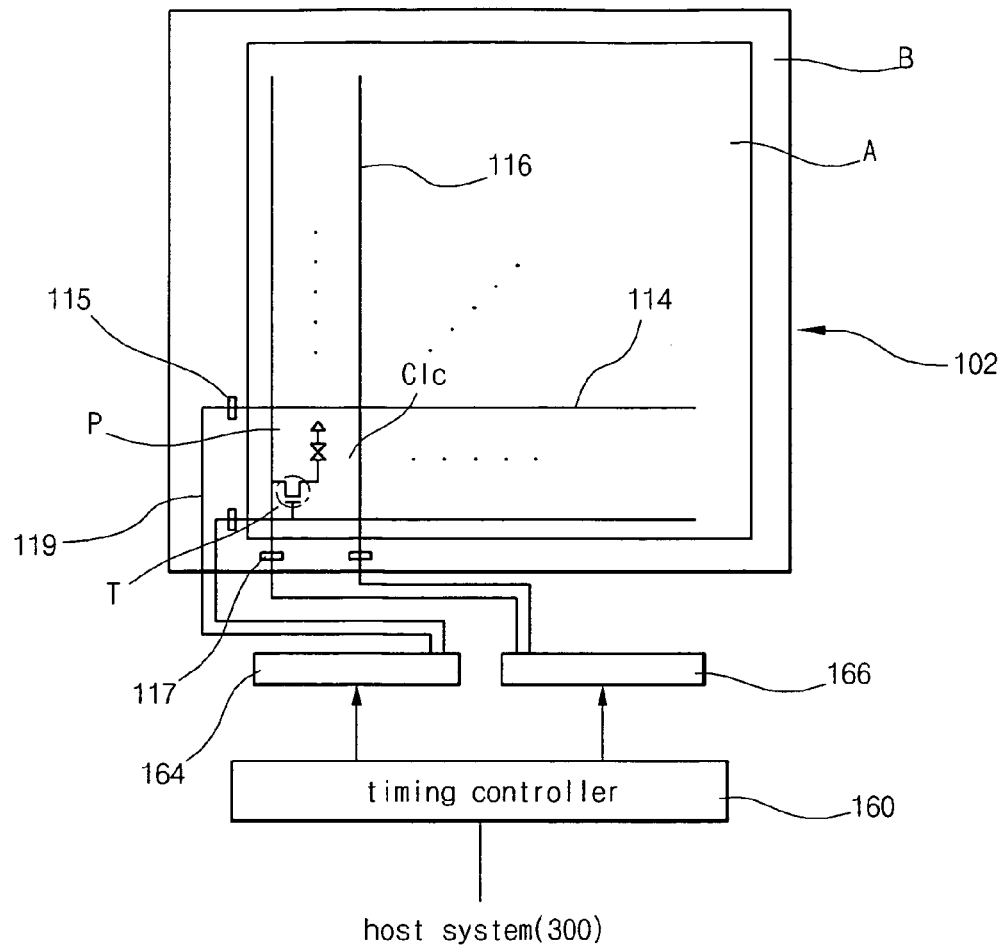
FIG. 4 is a schematic block diagram illustrating a flat panel display device of a mobile terminal according to a first embodiment of the present invention.

FIG. 4 is a schematic block diagram illustrating a liquid crystal display device of a mobile terminal according to a first embodiment of the present invention.

In FIG. 4, each LCD device 100 and 200 (of FIG. 2B) of a mobile terminal 50 (of FIG. 2A) includes a liquid crystal panel 102, and a gate line 114 and a data line 116 cross each other to define a pixel region "P." A TFT "T" is connected to the gate line 114 and the data line 116, and a pixel electrode 118 in the pixel region "P" is connected to the TFT "T." The TFT "T" includes a gate electrode connected to the gate line 114, a source electrode connected to the data line 116, a drain electrode connected to the pixel electrode 118, and a semiconductor layer as a path for carriers such as holes and electrons. The pixel electrode 118 and a common electrode 128 constitute a liquid crystal capacitor "Clc" with a liquid crystal layer interposed therebetween. An image signal, which is a charging signal or a driving signal for the liquid crystal capacitor "Clc," is supplied to the data line 116, while a scan signal, which is an ON/OFF signal for the TFT "T," is supplied to the gate line 114. Even though not shown in FIG. 4, a storage capacitor is connected to the TFT "T" in parallel with the liquid crystal capacitor "Clc" to minimize deterioration by a parasitic capacitance. Accordingly, the TFT "T" functions as a switching element applying the image signal of the data line 116 to the liquid crystal capacitor "Clc" according to the scan signal of the gate line 114, and a voltage difference between the pixel electrode 118 and the common electrode 128 is generated due to the image signal.

To drive the liquid crystal panel 102, a circuit unit 160 including a timing controller, a gate driver 164 and a data driver 166 are provided. In the timing controller 160, image data signals and clock signals are generated using image signal information from a host system 300 of the body unit (of FIG. 2A). In the gate driver 164 and the data driver 166, the scan signal and the image signal are generated using the image data signals and clock signals and supplied to the gate line 114 and the data line 116, respectively. Even though not shown in FIG. 4, the circuit unit further includes a grey level unit generating grey level voltages for the image signal and a power supply unit supplying a source power for the circuit unit.

The gate driver 164 and the data driver 166 are connected to the gate line 114 and the data line 116, respectively. The gate line 114 and the data line 116 extend to the non-display region "B" and the gate pad 115 and the data pad 117 are formed at the ends of the gate line 114 and the data line 116, respectively. The gate driver 164 and the data driver 166 are connected to the gate pad 115 and the data pad 117, respectively, through a connection line 119. When polycrystalline silicon is utilized as the semiconductor layer of the TFT "T," the gate driver 164 and the data driver 166 may be monolithically formed in the liquid crystal panel 102 to obtain a chip on glass (COG) structure. A flexible printed circuit (FPC) including the gate driver 164 and the data driver 166 may be connected to the gate pad 115 and the data pad 117 using a connection line in the FPC to obtain a chip on film (COF) structure. In addition, the gate driver 164 and the data driver 166 may be disposed at one side of the liquid crystal panel 102 to reduce a total size of the liquid crystal panel 102.

The first and second LCD devices 100 and 200 may display a single image in a first driving mode, and may display respective images in a second driving mode. To drive the first and second LCD devices 100 and 200 in the first and second driving modes, the body unit 60 further includes a host system.

Figure 5:
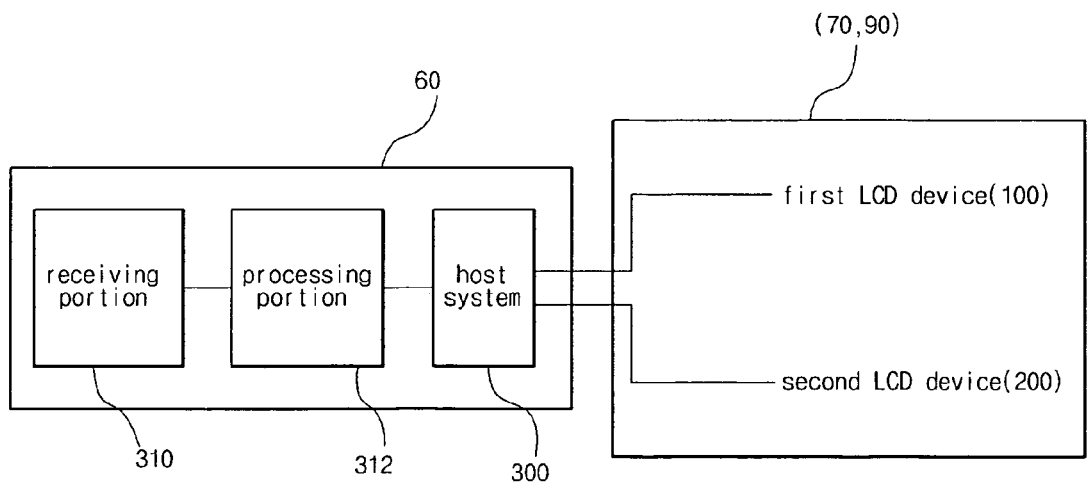
FIG. 5 is a schematic block diagram illustrating a mobile terminal according to a first embodiment of the present invention.

FIG. 5 is a schematic block diagram illustrating a mobile terminal according to a first embodiment of the present invention.

In FIG. 5, a body unit 60 includes a receiving portion 310, a processing portion 312 and a host system 300. The receiving portion 310 receives external signals from an external circuit and the processing portion 312 extracts video signals from the external signals. In the host system 300, the image signal information is generated by using the video signals according to the driving mode and supplied to the first and second LCD devices 100 and 200. The receiving portion 310 may include a data interface having an antenna receiving the external signals such as A/V contents having voices and video signals. Among the external signals, the video signals are selected and transmitted to the host system 300 by the processing portion 312.

In the first driving mode, the host system 300 divides a single image of the video signals into two sub-images and supplies the two sub-images to the first and second LCD devices 100 and 200, respectively, thereby the two sub-images displayed in the first and second LCD devices 100 and 200 constituting the single image as a whole. In the second driving mode, the host system 300 scales down a single image of the video signals and supplies the scaled-down single image to at least one of the first and second LCD devices 100 and 200, thereby the single image is displayed in the at least one of the first and second LCD devices 100 and 200. In the host system 300, the two sub-images and the scaled-down single image may be transformed into the image signal information that can be processed in drivers of the first and second LCD devices 100 and 200. Accordingly, the host system 300 may function as a video adapter. As a result, according to user's choice, a single image is displayed in the first and second LCD devices 100 and 200 as a whole in the first driving mode, or a single image is displayed in at least one of the first and second LCD devices 100 and 200 in the second driving mode.

Referring again to FIGS. 2A and 2B, the first and second LCD devices 100 and 200 of the mobile terminal 50 can display substantially a single image by unfolding the first and second LCD devices 100 and 200. In the first driving mode, specifically, an image separation at a border portion between the first and second LCD devices 100 and 200 is prevented to obtain a continuous single image. Accordingly, the first and second LCD devices 100 and 200 are disposed close to a folding line "L" between the display unit 70 and the extended display unit 90. However, since the liquid crystal panel 102 (of FIG. 4) includes the display region "A" (of FIG. 4) and the non-display region "B" (of FIG. 4) at a periphery of the display region "A" (of FIG. 4), the non-display region "B" is disposed close to the folding line "L" and the display region "A" (of FIG. 4) is separated from the folding line "L." To prevent an image separation due to the separation of the display regions "A" (of FIG. 4) and to further obtain a continuous single image, a micro lens film 150 (of FIG. 3) may be formed on an outer surface of the first and second LCD devices 100 and 200.

Figure 6A:
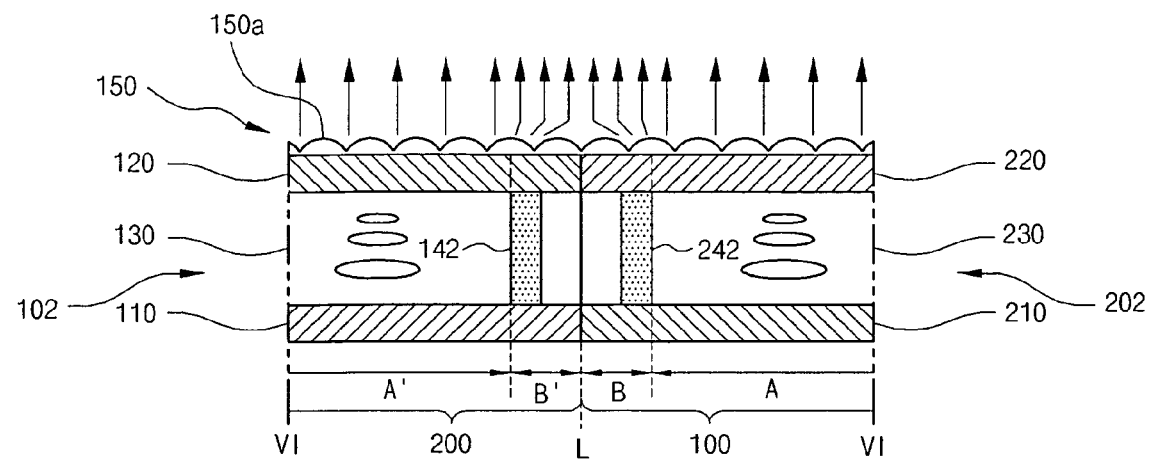
FIG. 6A is a schematic cross-sectional view taken along a line VI-VI of FIG. 2B.
Figure 6B:
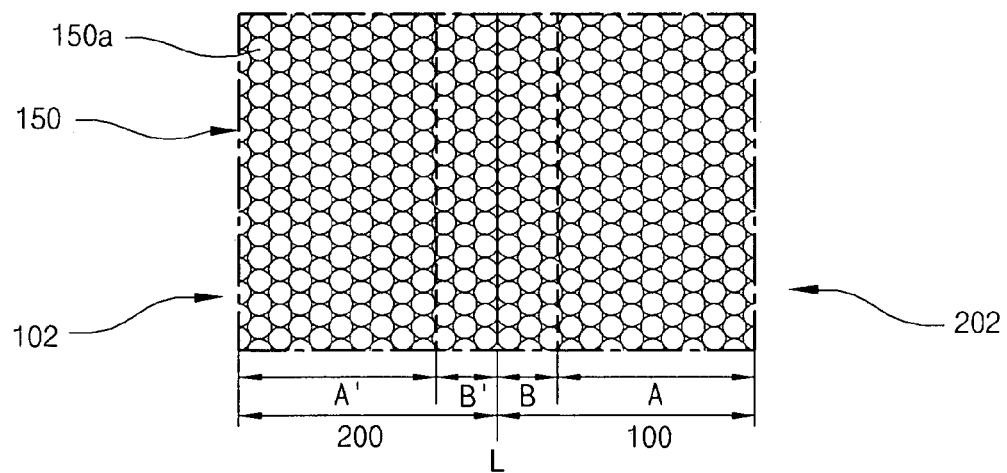
FIG. 6B is a schematic magnified view showing a "K" portion of FIG. 2B.

FIG. 6A is a schematic cross-sectional view taken along a line VI-VI of FIG. 2B, and FIG. 6B is a schematic magnified view showing a "K" portion of FIG. 2B.

In FIGS. 6A and 6B, the first and second LCD devices 100 and 200 include the first and second liquid crystal panels 102 and 202, respectively. Each of the first and second liquid crystal panels 102 and 202 includes the display region "A" and "A'" and the non-display region "B" and "B'." In addition, each of the first and second liquid crystal panels 102 and 202 includes the first substrate 110 and 210, the second substrate 120 and 220, the liquid crystal layer 130 and 230, and the seal pattern 142 and 242.

The corresponding non-display regions "B" and "B'" of the first and second liquid crystal panels 102 and 202 are disposed close to the folding line "L." The micro lens film 150 may be formed on an outer surface of the first and second liquid crystal panels 102 and 202. The micro lens film 150 may be formed of a transparent sheet having a plurality of protrusions 150a and each protrusion 150a may have a convex lens shape. The plurality of protrusions 150a may be periodically disposed on the entire outer surface of the first and second liquid crystal panels 102 and 202 or may be densely disposed in a portion adjacent to the folding line "L," for example, in the corresponding non-display regions "B" and "B'" and portions of the display regions "A" and "A'" adjacent to the corresponding non-display regions "B" and "B'." Accordingly, light passing through the portions of the display regions "A" and "A'" adjacent to the folding line "L" is refracted by the protrusions 105a. Since the refracted light is emitted from the corresponding non-display regions "B" and "B'," an image is displayed in the corresponding non-display regions "B" and "B'" adjacent to the folding line "L" and an image separation at a border portion between the first and second LCD device 100 and 200 is prevented. As a result, a continuous single image is recognized in the first driving mode of the mobile terminal 50. Accordingly, a diameter of each protrusion 150a may be in a range of about several micrometers to about several hundreds of micrometers, and the plurality of protrusions 150a may be continuously disposed to contact each other.

Referring again to FIGS. 2A and 2B, a hinge 80 is formed between the display unit 70 and the extended display unit 90. The first and second LCD devices 100 and 200 are stably folded and unfolded with a contact status due to the hinge 80. The hinge 80 includes first and second hinge terminals 82 and 84 and first and second shafts 86 and 88. The first and second hinge terminals 82 and 84 extend from the display unit 70 and the extended display unit 90, respectively, to the folding line "L," and overlap each other. In addition, the first and second shafts 86 and 88 penetrate the overlapped first and second hinge terminals 82 and 84. The first and second shafts 86 and 88 coincide with the folding line "L." In addition, the first and second hinge terminals 82 and 84 may alternately overlap each other such that an impact due to the folding/unfolding operation is effectively dispersed and the first and second LCD devices 100 and 200 are unfolded with a minimum separation distance.

Accordingly, the mobile terminal 50 according to the first embodiment of the present invention displays a single image without image separation throughout the first and second LCD devices 100 and 200 in the first driving mode, and displays respective images throughout the first and second LCD devices 100 and 200 in the second driving mode.

Figure 7A:
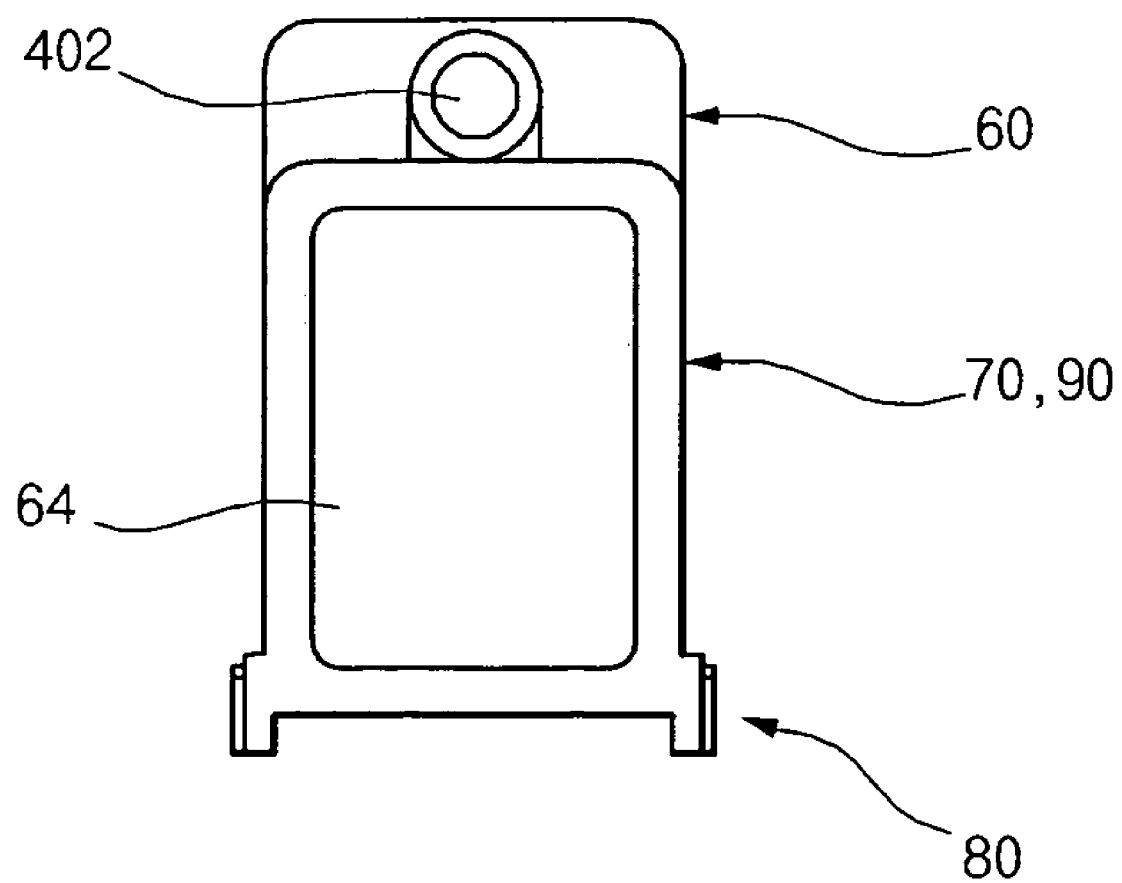
FIGS. 7A to 7C are schematic plane views showing an operation of a mobile terminal according to a second embodiment of the present invention.
Figure 7B:
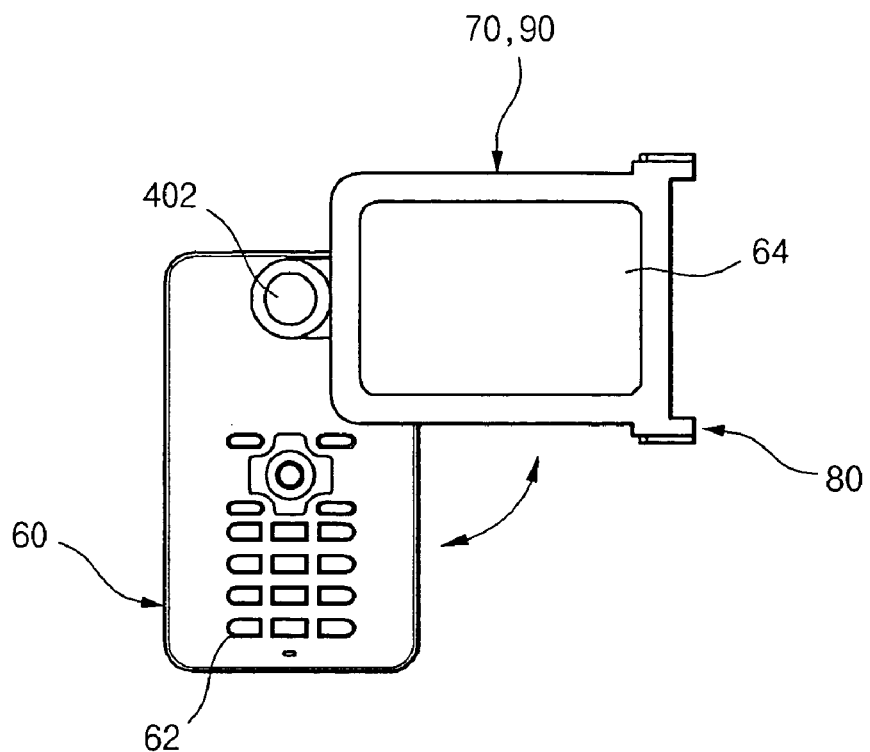
Figure 7C:
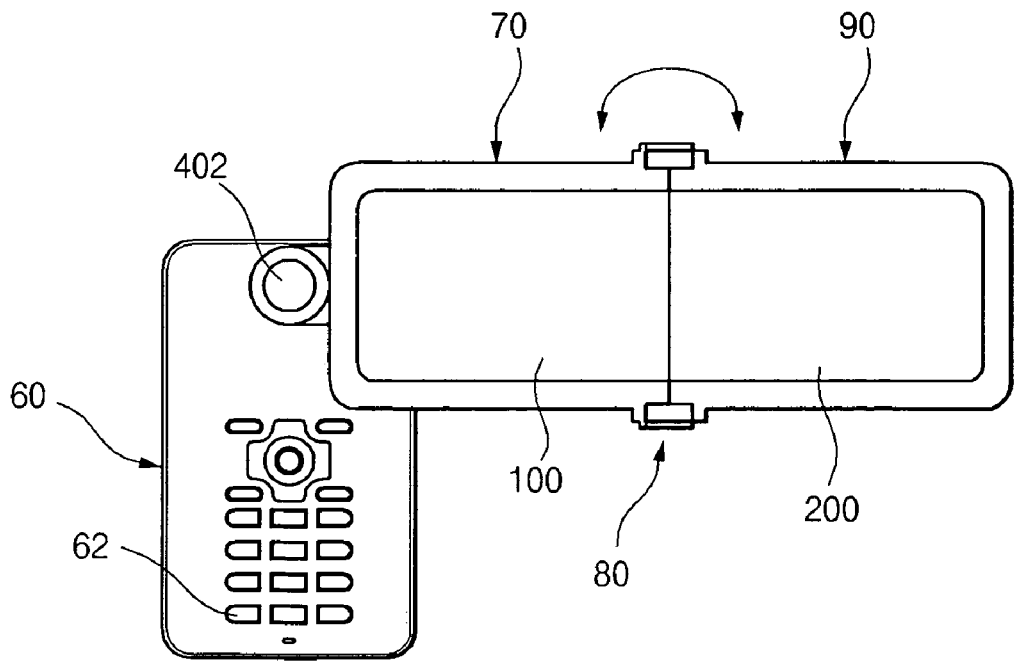

FIGS. 7A to 7C are schematic plane views showing an operation of a mobile terminal according to a second embodiment of the present invention.

In FIGS. 7A to 7C, the mobile terminal includes a body unit 60, a display unit 70, an extended display unit 90 and a pivot unit 402 such as a shaft. The body unit 60 overlaps the display unit 70, and the pivot unit 402 connects the body unit 60 and the display unit 70. A control or input device 62, such as a key pad, may be formed on a portion of the body unit 60 overlapping the display unit 70, and the extended display unit 90 may be unfolded from the display unit 70 to an exterior.

Accordingly, as illustrated in FIG. 7A, the body unit 60 overlaps the display unit 70 and the extended display unit 90 in the mobile terminal of the second embodiment. In addition, as illustrated in FIG. 7B, the display unit 70 and the extended display unit 90 that are folded are rotated from the body unit 60 with respect to the pivot unit 402 to expose the input device 62, thereby allowing use of the mobile terminal as a telephone. Moreover, as illustrated in FIG. 7C, when the extended display unit 90 is unfolded from the display unit 70, a single image is displayed through first and second FPD devices (such as LCD devices) 100 and 200 in a first driving mode or two single images are displayed through the first and second LCD devices 100 and 200, respectively, in a second driving mode.

An additional flat panel display (FPD) may be formed on an opposite surface to the extended display unit 90 to display a simple image when the display unit 70 and the extended display unit 90 are folded. Further, even though not shown in FIGS. 7A to 7C, a micro lens film may be formed on the first and second LCD devices 100 and 200, and the display unit 70 and the extended display unit 90 are connected using a hinge 80.

Figure 8A:
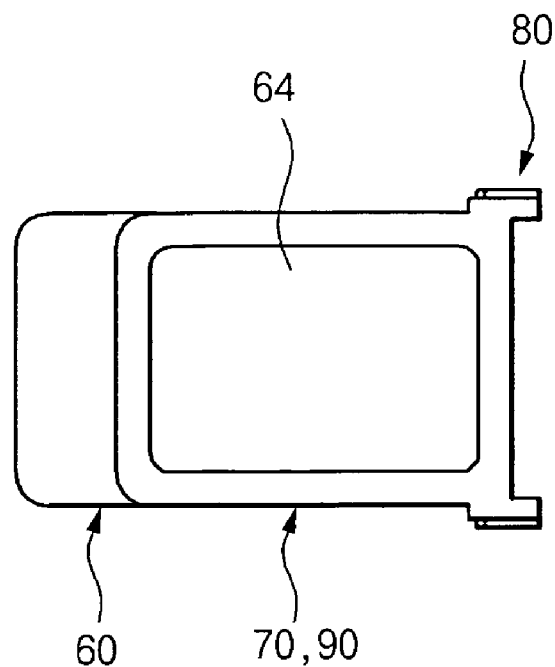
FIGS. 8A to 8C are schematic plane views showing an operation of a mobile terminal according to a third embodiment of the present invention.
Figure 8B:
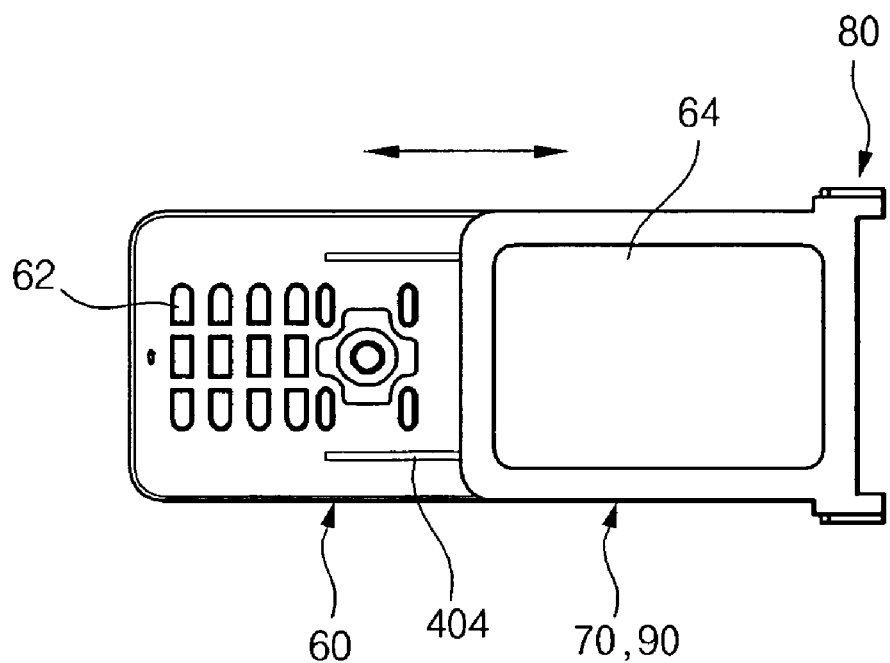
Figure 8C:
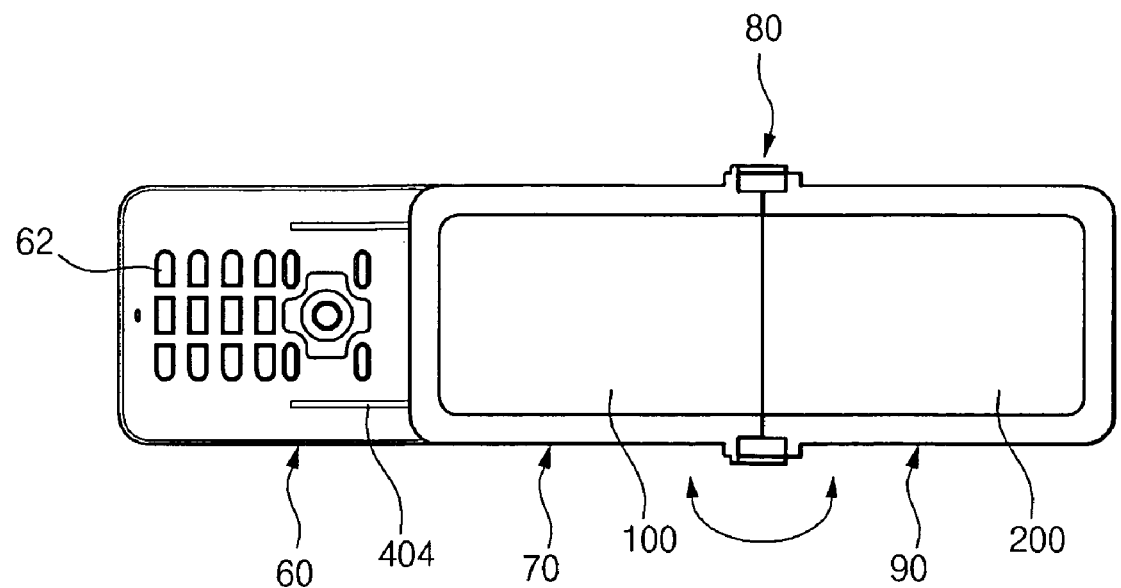

FIGS. 8A to 8C are schematic plane views showing an operation of a mobile terminal according to a third embodiment of the present invention.

In FIGS. 8A to 8C, the mobile terminal includes a body unit 60, a display unit 70, an extended display unit 90 and a sliding unit 404 such as a sliding groove and a corresponding protrusion. The body unit 60 overlaps the display unit 70, and the body unit 60 and the display unit 70 slide along an opposite direction using the sliding unit 404. A control or input device 62, such as a key pad, may be formed on a portion of the body unit 60 contacting the display unit 70, and the extended display unit 90 may be unfolded from the display unit 70 to an exterior.

Accordingly, as illustrated in FIG. 8A, the body unit 60 overlaps the display unit 70 and the extended display unit 90 in the mobile terminal of the third embodiment. In addition, as illustrated in FIGS. 8A and 8B, an additional flat panel display (FPD) 64 may be formed on an opposite surface to the extended display unit 90. As illustrated in FIG. 8B, the display unit 70 and the extended display unit 90 that are folded slide from the body unit 60 to expose the control 62, thereby allowing use of the mobile terminal as a telephone. Moreover, as illustrated in FIG. 8C, when the extended display unit 90 is unfolded from the display unit 70, a single image is displayed through first and second FPD devices (such as LCD devices) 100 and 200 in a first driving mode or two single images are displayed through the first and second LCD devices 100 and 200, respectively, in a second driving mode. Further, even though not shown in FIGS. 8A to 8C, a micro lens film may be formed on the first and second FPD devices 100 and 200, and the display unit 70 and the extended display unit 90 are connected using a hinge 80.

Figure 9A:
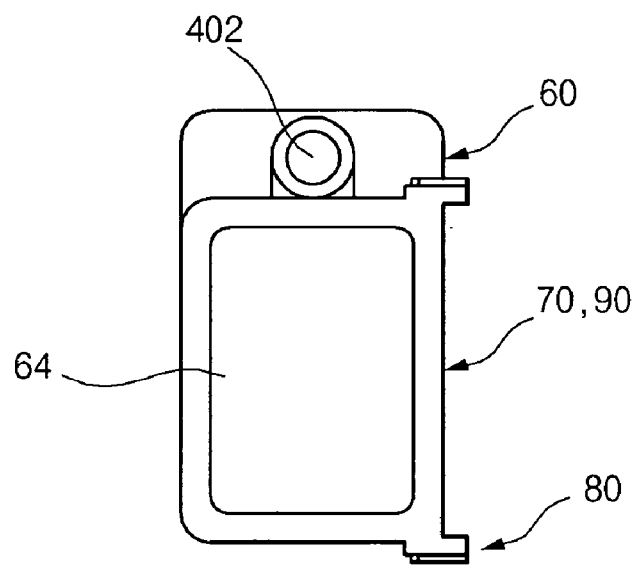
FIGS. 9A to 9C are schematic plane views showing an operation of a mobile terminal according to a fourth embodiment of the present invention.
Figure 9B:
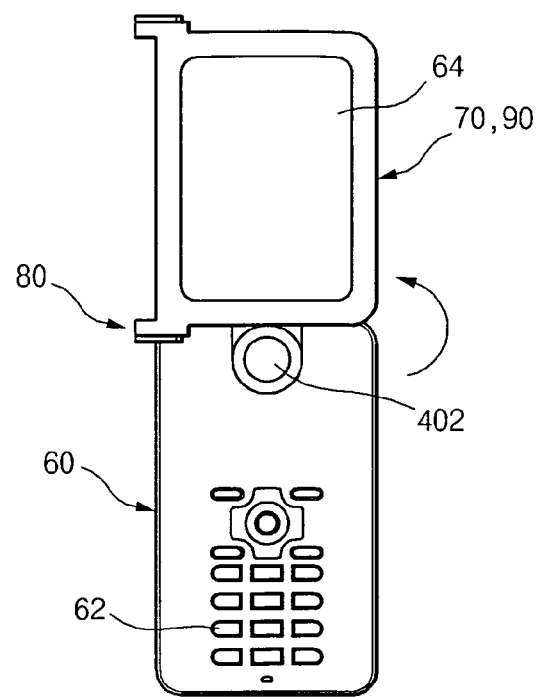
Figure 9C:
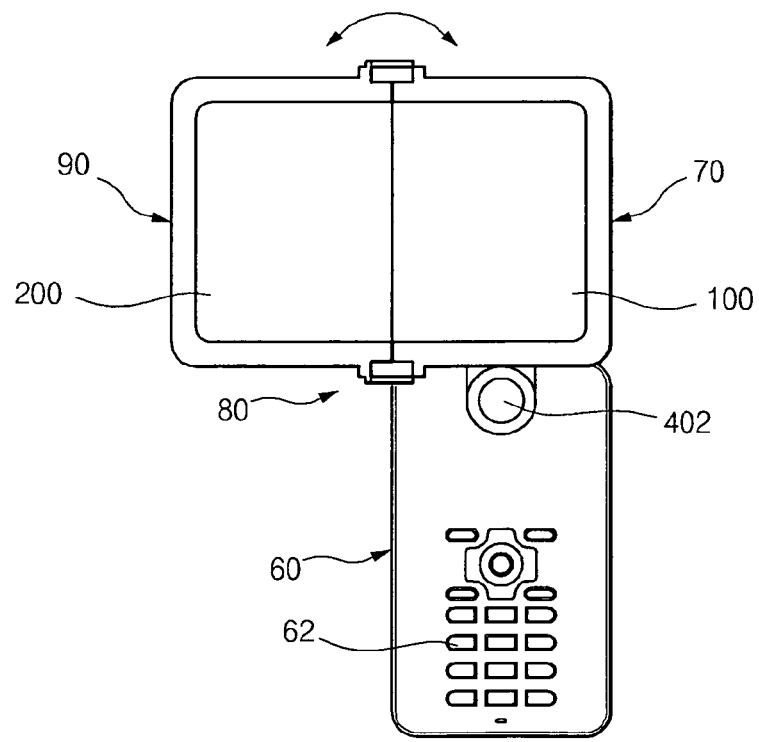

FIGS. 9A to 9C are schematic plane views showing an operation of a mobile terminal according to a fourth embodiment of the present invention.

In FIGS. 9A to 9C, the mobile terminal includes a body unit 60, a display unit 70, an extended display unit 90 and a pivot unit 402 such as a shaft. The body unit 60 overlaps the display unit 70, and the pivot unit 402 connects the body unit 60 and the display unit 70. A control or input device 62, such as a key pad, may be formed on a portion of the body unit 60 contacting the display unit 70, and the extended display unit 90 may be unfolded from the display unit 70 to an exterior with respect to a long side of the display unit 70 and the extended display unit 90.

Accordingly, as illustrated in FIG. 9A, in the mobile terminal of the fourth embodiment, the body unit 60 overlaps the display unit 70 and the extended display unit 90. In addition, as illustrated in FIG. 9B, the display unit 70 and the extended display unit 90 that are folded are rotated from the body unit 60 with respect to the pivot unit 402 to expose the input device 62, thereby allowing use of the mobile terminal as a telephone. Moreover, as illustrated in FIG. 9C, when the extended display unit 90 is unfolded from the display unit 70, a single image is displayed through first and second FPD devices (such as LCD devices) 100 and 200 in a first driving mode or two single images are displayed through the first and second FPD devices 100 and 200, respectively, in a second driving mode. Since the folding line is changed as compared with the first to third embodiment, a size ratio of display area is changed.

An additional flat panel display (FPD) 64 may be formed on an opposite surface to the extended display unit 90 to display a simple image when the display unit 70 and the extended display unit 90 are folded. Further, even though not shown in FIGS. 9A to 9C, a micro lens film may be formed on the first and second LCD devices 100 and 200, and the display unit 70 and the extended display unit 90 are connected using a hinge 80.

Figure 10A:
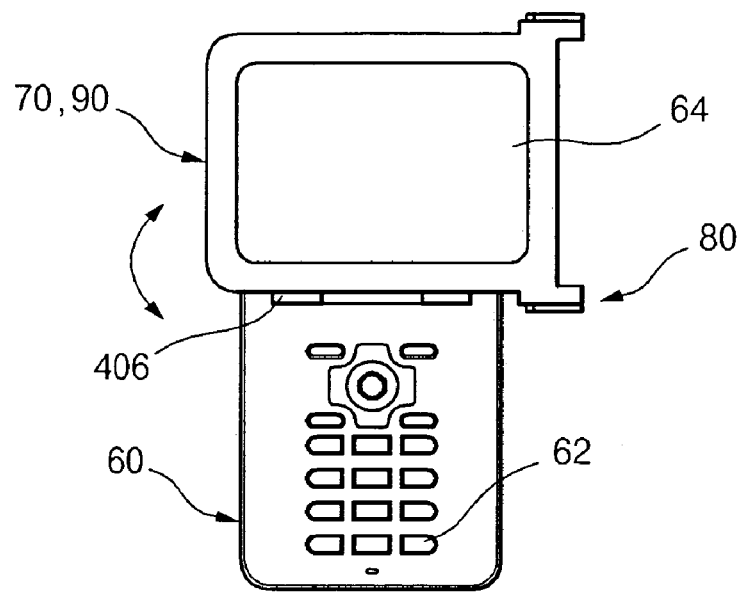
FIGS. 10A and 10B are schematic plane views showing an operation of a mobile terminal according to a fifth embodiment of the present invention.
Figure 10B:
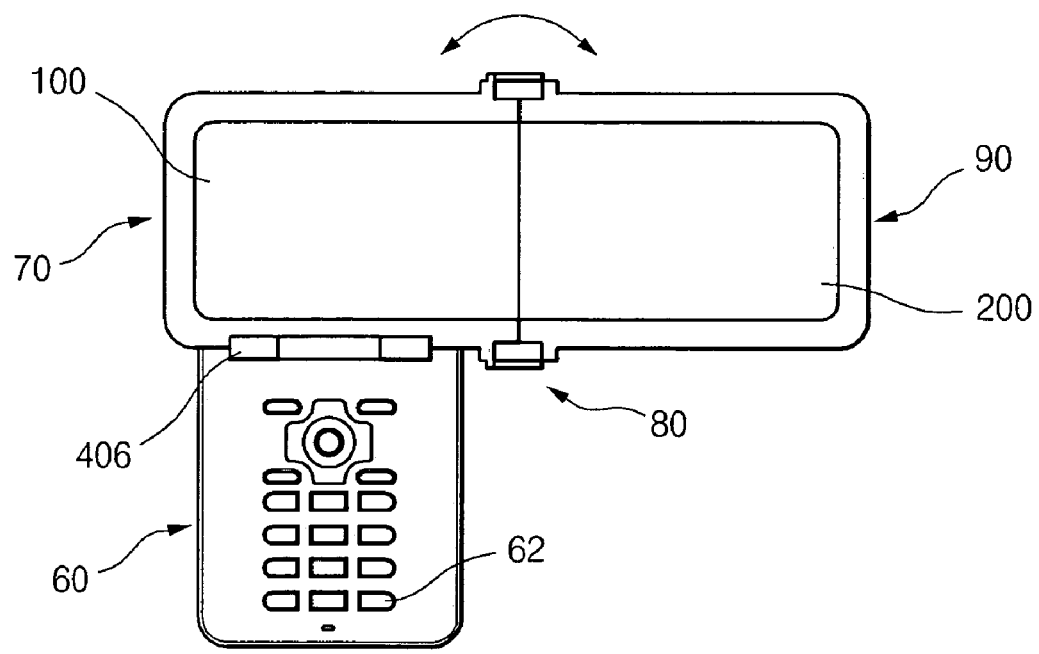

FIGS. 10A and 10B are schematic plane views showing an operation of a mobile terminal according to a fifth embodiment of the present invention.

In FIGS. 10A and 10B, the mobile terminal includes a body unit 60, a display unit 70, an extended display unit 90, an auxiliary hinge 406 and a hinge 80. The body unit 60 overlaps the display unit 70, and the body unit 60 and the display unit 70 are unfolded with respect to the auxiliary hinge 406. A control or input device 62 such as a key pad may be formed on a portion of the body unit 60 overlapping the display unit 70, and the extended display unit 90 may be unfolded from the display unit 70.

Accordingly, as illustrated in FIG. 10A, in the mobile terminal of the fifth embodiment, the body unit 60 overlaps the display unit 70 and the extended display unit 90. In addition, as illustrated in FIGS. 10A and 10B, an additional flat panel display (FPD) 64 may be formed on an opposite surface to the display unit 70 and/or the extended display unit 90. As illustrated in FIG. 10A, the display unit 70 and the extended display unit 90 that are folded are unfolded from the body unit 60 to expose the input device 62, thereby allowing use of the mobile terminal as a telephone. Moreover, as illustrated in FIG. 10B, when the extended display unit 90 is unfolded from the display unit 70, a single image is displayed through first and second FPD devices (such as LCD devices) 100 and 200 in a first driving mode or two single images are displayed through the first and second LCD devices 100 and 200, respectively, in a second driving mode. Further, even though not shown in FIGS. 10A and 10B, a micro lens film may be formed on the first and second LCD devices 100 and 200, and the display unit 70 and the extended display unit 90 are connected using the hinge 80.

Figure 11:
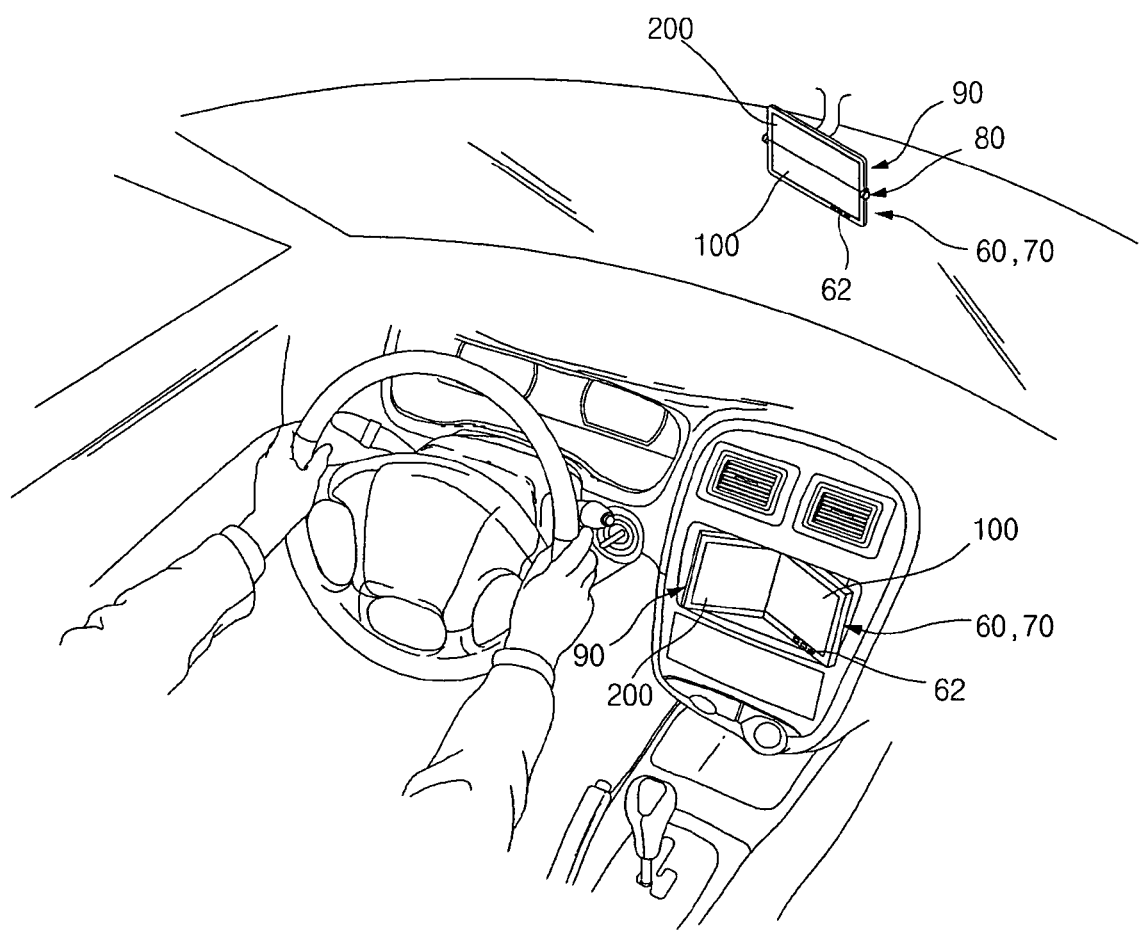
FIG. 11 is a schematic view showing an operation of a mobile terminal according to a sixth embodiment of the present invention.

FIG. 11 is a schematic view showing an operation of a mobile terminal according to a sixth embodiment of the present invention. In the sixth embodiment, the mobile terminal may be applied to one of a car navigation system, a small-size television, a digital video disc (DVD) or the like.

In FIG. 11, the mobile terminal includes a body unit 60, a display unit 70, an extended display unit 90 and a hinge 80. The display unit 70 and the extended display unit 90 are folded/unfolded using the hinge 80. First and second FPD devices (such as LCD devices) 100 and 200 of the display unit 70 and the extended display unit 90 may be used as a monitor for a television or a navigator. In addition, the body unit 60 may be monolithically formed at an opposite portion to the display unit 70 or may be monolithically formed under the display unit 70. A control 62 for ON/OFF may be disposed at a lower portion of the display unit 70.

The mobile terminal may be disposed at various positions according to user's choice. For example, the mobile terminal may be disposed as a back (rear-view) mirror. When the display unit 70 and the extended display unit 90 are unfolded, a single image or two single images can be displayed through the first and second FPD devices 100 and 200. When the display unit 70 and the extended display unit 90 are folded, a mirror formed on an opposite surface to the display unit 70 functions as a back mirror. In addition, the mobile terminal may be disposed at a side portion of a driver. The display unit 70 and the extended display unit 90 may be folded, and a single image or two single images can be displayed through the first and second FPD devices 100 and 200 when the display unit 70 and the extended display unit 90 are unfolded.

Figure 12:
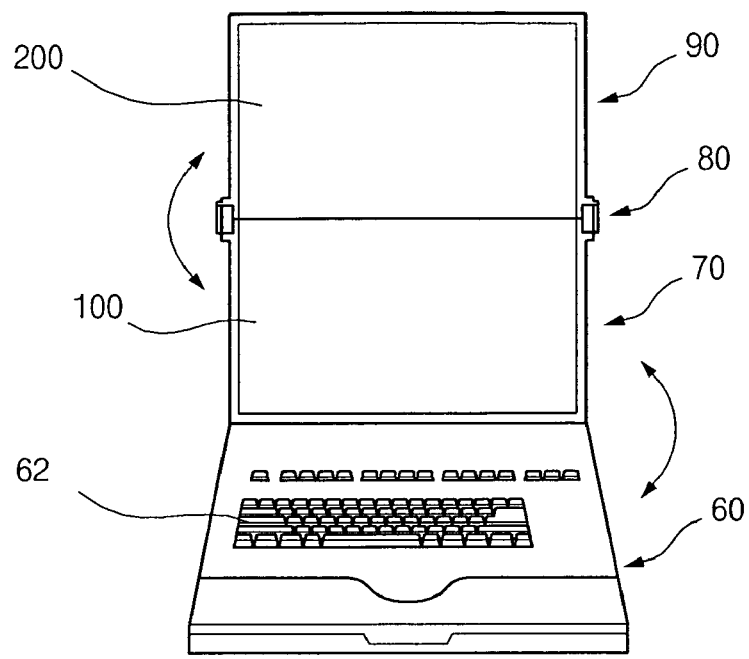
FIGS. 12 and 13 are schematic views showing an operation of a mobile terminal according to a seventh embodiment of the present invention.
Figure 13:
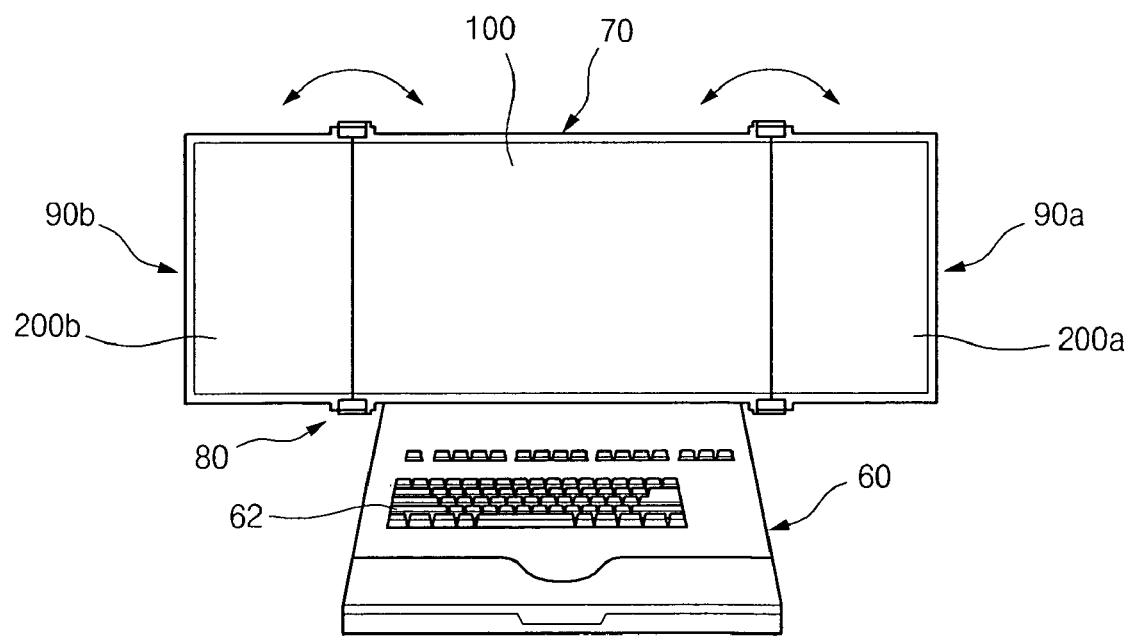

FIGS. 12 and 13 are schematic views showing an operation of a mobile terminal according to a seventh embodiment of the present invention. In the seventh embodiment, the mobile terminal may be applied to one of a notebook computer and a laptop computer or the like.

In FIG. 12, the mobile terminal includes a body unit 60 having a control or input device 62 such as a key board, a display unit 70 and an extended display unit 90. The display unit 70 and the extended display unit 90 are connected to each other using a hinge 80. Even though not shown in FIG. 12, the body unit 60 is connected to the display unit 70 using an additional hinge system, as may be known in the art. In addition, the extended display unit 90 may be connected to the display unit 70 from a side portion. An additional flat panel display (FPD) may be formed on an opposite surface to the extended display unit 90.

In FIG. 13, the mobile terminal includes a body unit 60 having a control or input device 62 such as a key board, a display unit 70, a first extended display unit 90a and a second extended display unit 90b. The first and second extended display units 90a and 90b are connected to the display unit 70 from both sides of the display unit 70 using two hinges 80. First, second and third FPD devices (such as LCD devices) 100, 200 and 300 are formed in the display unit 70, the first extended display unit 90a and the second extended display unit 90b, respectively. Even though not shown in FIG. 13, the body unit 60 and the display unit 70 may be folded using an additional hinge system as may be known in the art. As illustrated in the above embodiments, when the display unit 70, the first extended display unit 90a and the second extended display unit 90b are unfolded, a single image may be displayed throughout the display unit 70, the first extended display unit 90a and the second extended display unit 90b or three single images may be displayed throughout the display unit 70, the first extended display unit 90a and the second extended display unit 90b, respectively, according to a driving mode.

In the notebook computer display in FIGS. 12 and 13, for example, the body unit 60 may be much smaller than conventional notebook computers but through the present invention, the display area may either remain substantially the same size as the conventional notebook computer or be bigger.

In the present invention, since a mobile terminal has at least two flat panel display liquid devices that can be folded, a mobile terminal keeps the portability with increased display size. A micro lens film may be formed on the FPD devices to display a more continuous single image with minimal or no image separation at a border portion of the FPD devices. Accordingly, when the FPD devices are unfolded, a single image can be displayed throughout the FPD devices or a respective single image can be displayed through the LCD devices according to a driving mode.

Moreover, a mobile terminal of the present invention can be applied to a monitor for displaying video contents such as in a cellular phone, a notebook computer, a personal digital assistant (PDA), a navigation system, a digital camera, a digital camcorder and a small-sized television.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile terminal having a flat panel display devices, comprising:
    a body unit having an input device;
    a first display unit connected to the body unit;
    a second display unit connected to the first display unit, the first display unit and the second display unit being movable with respect to each other;
    a first flat panel display device in the first display unit; and
    a second flat panel display device in the second display unit, wherein the first display unit and the second display unit combine to form a third display unit, the third display unit being larger than each of the first and second display units, wherein each of the first and second flat panel display devices includes a display region and a non-display region at a periphery of the display region, wherein the first and second flat panel display devices meet at a display dividing line, wherein each of the first and second flat panel display devices includes a micro lens film having a plurality of protrusions overlaying the first and second display units, wherein each of the plurality of protrusions is disposed in contact with each other and has a convex lens shape, wherein a density of the protrusions in a portion corresponding to the non-display region of each of the first and second flat panel display devices and adjacent to the display dividing line between the first display unit and the second display unit is greater than a density of the protrusions in a portion corresponding to the display region of each of the first and second flat panel display devices and adjacent to opposite ends of the first display unit and the second display unit, and wherein light emitted from the portion adjacent the display dividing line is refracted to provide a continuous image throughout the first and second display units without image separation.

2. A mobile terminal according to claim 1, wherein the first and second display units are connected to each other using a hinge.

3. A mobile terminal according to claim 1, wherein the first and second display units include a liquid crystal display.

4. A mobile terminal according to claim 1, wherein the third display unit displays an image in one of a first mode and a second mode.

5. A mobile terminal according to claim 4, further comprising a third mode.

6. A mobile terminal according to claim 4, wherein the first mode displays an image using the entire third display unit as a whole.

7. A mobile terminal according to claim 4, wherein the second mode displays first and second images simultaneously corresponding to the first and second display units.

8. A mobile terminal according to claim 4, wherein the third mode displays an entire image in only one of the first and second display units.

9. A mobile terminal having a flat panel display devices, comprising:
    a body unit having an input device;
    a first display unit connected to the body unit;
    a second display unit connected to the first display unit, the first display unit and the second display unit being movable with respect to each other;
    a first flat panel display device in the first display unit; and
    a second flat panel display device in the second display unit, wherein each of the first and second flat panel display devices further includes a display region and a non-display region at a periphery of the display region, wherein the first and second display units fold at a folding line, wherein each of the first and second flat panel display devices includes a micro lens film having a plurality of protrusions overlaying the first and second display units, wherein each of the plurality of protrusions is disposed in contact with each other and has a convex lens shape, wherein a density of the protrusions in a portion corresponding to the non-display region of each of the first and second flat panel display devices and adjacent to the folding line between the first display unit and the second display unit is greater than a density of the protrusions in a portion corresponding to the display region of each of the first and second flat panel display devices and adjacent to opposite ends of the first display unit and the second display unit, and wherein light emitted from the portion adjacent the folding line is refracted to provide a continuous image throughout the first and second display units without image separation.

10. A mobile terminal according to claim 9, wherein the body unit comprises:
    a receiving portion receiving external signals; and
    a host system generating image signal information for one of first and second driving modes using the external signals.

11. The mobile terminal according to claim 9, wherein the body unit and the first display unit are integrally formed at opposite surfaces to each other.

12. The mobile terminal according to claim 9, wherein the body unit and the first display unit are integrally formed as one unit.

13. The mobile terminal according to claim 9, wherein the body unit and the first display unit overlap each other using a connection means.

14. The mobile terminal according to claim 13, wherein the connection means includes a pivot unit rotating the body unit and the first display unit relatively.

15. The mobile terminal according to claim 14, wherein the second display unit is foldable and unfoldable from the first display unit via a hinge.

16. The mobile terminal according to claim 13, wherein the connection means includes a sliding unit, whereby the body unit and the first display unit are slidable in opposite directions.

17. The mobile terminal according to claim 16, wherein the second display unit is foldable and unfoldable from the first display unit via a hinge.

18. The mobile terminal according to claim 13, wherein the connection means includes an auxiliary hinge so that the body unit and the first display unit are foldable and unfoldable with respect to each other.

19. The mobile terminal according to claim 18, wherein the second display unit is foldable and unfoldable with respect to the first display unit.

20. The mobile terminal according to claim 9, wherein the second display unit includes first and second extended display units connected to the first display unit in a folder type.

21. The mobile terminal according to claim 9, wherein the second display unit includes a first extended display unit connected to the first display unit in a folder type and a second extended display unit connected to the first display unit in a folder type.

22. The mobile terminal according to claim 9, wherein the first display unit and the second display unit are movable with respect to each other via a hinge, and
wherein the hinge comprises:
first and second hinge terminals extending from the first display unit and the second display unit, respectively, and overlapping each other at an outer portion of the first display unit and the second display unit; and
first and second shafts penetrating the overlapped first and second hinge terminals.

23. The mobile terminal according to claim 22, wherein the first and second shafts coincide with a folding line between the first display unit and the second display unit.

24. The mobile terminal according to claim 23, wherein the first and second hinge terminals are alternately overlapping each other.

25. The mobile terminal according to claim 9, wherein the first and second display units include first and second liquid crystal display devices.

26. The mobile terminal according to claim 25, wherein each of the first and second liquid crystal display devices comprises:
a first substrate including a gate line, a data line crossing the gate line to define a pixel region, a thin film transistor connected to the gate line and the date line, and a pixel electrode in the pixel region; and
a second substrate facing the first substrate with a liquid crystal layer interposed therebetween, the second substrate including a black matrix having open portions exposing the pixel electrode, a color filter layer having red, green and blue sub-color filters corresponding to the open portions, and a common electrode on the color filter layer.

27. The mobile terminal according to claim 26, wherein each of the first and second liquid crystal display devices further includes a backlight assembly under the first substrate.

28. The mobile terminal according to claim 27, wherein the backlight assembly includes a light emitting diode (LED).

29. The mobile terminal according to claim 25, wherein a single image is displayed throughout the first and second liquid crystal display devices in a first driving mode and two single images are displayed throughout the first and second liquid crystal display devices, respectively, in a second driving mode.

30. The mobile terminal according to claim 29, wherein the body unit comprises:
a receiving portion receiving external signals; and
a host system generating image signal information for one of the first and second driving modes using the external signals,
wherein each of the first and second liquid crystal display devices comprises:
a timing controller for generating image data signals and clock signals using the image signal information from the host system;
a gate driver for generating and supplying a scan signal using the image data signals and clock signals to the gate line; and
a data driver for generating and supplying an image signal using the image data signals and clock signals to the data line.

31. The mobile terminal according to claim 30, wherein the gate driver and the data driver are formed on the first substrate of each of the first and second liquid crystal display devices.

32. The mobile terminal according to claim 30, wherein a gate driver and the data driver are formed on a flexible printed circuit (FPC) connected to the first substrate of each of the first and second liquid crystal display devices.

33. The mobile terminal according to claim 30, wherein the body unit further includes a processing portion for extracting video signals from the external signals,
and wherein the host system divides a single image of the video signals into two sub-images and supplies the two sub-images to the first and second liquid crystal display devices, respectively, in the first driving mode and scales down a single image of the video signals and supplies the scaled-down single image to the first and second liquid crystal display devices in the second driving mode.

34. The mobile terminal according to claim 9, wherein the mobile terminal includes one of a cellular phone, a notebook computer, a personal digital assistant (PDA), and a navigation system.

* * * * *